United States Patent
Lee et al.

(10) Patent No.: US 9,180,756 B2
(45) Date of Patent: Nov. 10, 2015

(54) APPARATUS AND METHOD FOR DETECTING DRIVER'S DAZZLING AND SYSTEM AND METHOD FOR BLOCKING DAZZLING USING THE SAME

(75) Inventors: Byoung Joon Lee, Gyeonggi-do (KR); Ho Choul Jung, Gyeonggi-do (KR); Sam Yong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 583 days.

(21) Appl. No.: 13/486,139

(22) Filed: Jun. 1, 2012

(65) Prior Publication Data
US 2013/0147936 A1     Jun. 13, 2013

(30) Foreign Application Priority Data
Dec. 12, 2011   (KR) .................. 10-2011-0133158

(51) Int. Cl.
| | | |
|---|---|---|
| H04N 7/18 | (2006.01) | |
| G02B 27/00 | (2006.01) | |
| G06K 9/40 | (2006.01) | |
| G06K 9/34 | (2006.01) | |
| G06T 15/50 | (2011.01) | |
| G01B 11/24 | (2006.01) | |
| G06F 7/00 | (2006.01) | |
| B60J 3/04 | (2006.01) | |
| B60Q 1/08 | (2006.01) | |
| B60Q 1/10 | (2006.01) | |
| B60J 3/00 | (2006.01) | |
| G06K 9/00 | (2006.01) | |

(52) U.S. Cl.
CPC .... *B60J 3/04* (2013.01); *B60J 3/00* (2013.01); *B60Q 1/085* (2013.01); *B60Q 1/10* (2013.01); *G06K 9/00845* (2013.01)

(58) Field of Classification Search
CPC ............................ B60J 3/04; G06K 9/00845
See application file for complete search history.

(56) References Cited

U.S. PATENT DOCUMENTS

| | | | | |
|---|---|---|---|---|
| 5,714,751 | A * | 2/1998 | Chen ........................ | 250/203.4 |
| 6,926,430 | B2 * | 8/2005 | Dari et al. .................. | 362/466 |
| 6,962,196 | B2 * | 11/2005 | Tsunoda ..................... | 165/204 |

(Continued)

FOREIGN PATENT DOCUMENTS

| | | |
|---|---|---|
| JP | 2000108660 A | 4/2000 |
| JP | 2001-225666 A | 8/2001 |

(Continued)

OTHER PUBLICATIONS

Direct Light Detecting Device, Matsuo Haruo, JP 2006251926, filed Aug. 3, 2005.*

*Primary Examiner* — Jorge L Ortiz Criado
*Assistant Examiner* — Yong Joon Kwon
(74) *Attorney, Agent, or Firm* — Mintz Levin Cohn Ferris Glovsky and Popeo, P.C.; Peter F. Corless (57) ABSTRACT

A technique for detecting whether dazzling is affecting the drivers driving ability when the eye area is included in the area to which the direct sunlight is incident is provided. More particularly of the technique detects a facial area and an eye area of a driver's image, and an area to which direct sunlight is incident in the facial area, and then determines whether dazzling is effecting the drivers driving ability when the eye area is included in the area to which the direct sunlight is incident to detect a direction of incidence of the direct sunlight and then, automatically blocks the direct sunlight in the direction to which light is incident via a blocking apparatus.

6 Claims, 10 Drawing Sheets

(56) References Cited

U.S. PATENT DOCUMENTS

| | | | |
|---|---|---|---|
| 7,936,944 B2* | 5/2011 | Sato et al. | 382/274 |
| 8,351,648 B2* | 1/2013 | Kamioka et al. | 382/103 |
| 2003/0206171 A1* | 11/2003 | Kim et al. | 345/473 |
| 2010/0073402 A1* | 3/2010 | Delia et al. | 345/625 |
| 2010/0094501 A1* | 4/2010 | Kwok | 701/36 |

FOREIGN PATENT DOCUMENTS

| | | |
|---|---|---|
| JP | 2002087060 A | 3/2002 |
| JP | 2002331835 A | 11/2002 |
| JP | 2003-260933 A | 9/2003 |
| JP | 2004352182 A | 12/2004 |
| JP | 2005035384 A | 2/2005 |
| JP | 2005178484 A | 7/2005 |
| JP | 2006-251926 A | 9/2006 |
| JP | 2006522699 A | 10/2006 |
| JP | 2007308069 A | 11/2007 |
| JP | 2008006991 A | 1/2008 |
| JP | 2008239009 A | 10/2008 |
| KR | 10-2006-0062505 | 6/2006 |

* cited by examiner

Fig.8

APPARATUS AND METHOD FOR DETECTING DRIVER'S DAZZLING AND SYSTEM AND METHOD FOR BLOCKING DAZZLING USING THE SAME

CROSS-REFERENCE TO RELATED APPLICATION

This application is based on and claims priority from Korean Patent Application No. 10-2011-0133158, filed on Dec. 12, 2011 in the Korean Intellectual Property Office, the disclosure of which is incorporated herein in its entirety by reference.

BACKGROUND OF THE INVENTION

1. Field of the Invention

The present invention relates to an apparatus and a method for detecting driver's dazzling and a system and a method for blocking dazzling using the same.

2. Related Art

When direct sunlight is directly comes in contact with a driver's eyes while driving a vehicle, dazzling the driver may become dazzled, which hinders driving safety. As a solution, some manufactures have implemented smart windows, electric sun visors or the like within the vehicle to protect the driver from dazzling.

A smart window is an apparatus that actively controls visible light transmittance by manually applying power to laminated glass having a special film inserted thereinto. Upon providing this power to the laminated glass, the light transmission properties of the glass are affected to provide a form of transmissive light shield for the driver.

An electric sun-visor is an apparatus which blocks direct sunlight incident from a front or sides of the vehicle by moving a cover shield in the vehicle via switching operation. However, since the operation of these devices is manually operated by the driver, the driver still has to take his or her eyes off the road to appropriately adjust the visor to his or her liking thereby effecting driving safety.

SUMMARY OF THE INVENTION

Accordingly, the present invention has been made to solve the above-mentioned problems occurring in the prior art while advantages achieved by the prior art are maintained intact.

More specifically, the present invention provides an apparatus and a method for detecting whether or not the driver is dazzling. In particular, the illustrative embodiment of the present invention detects a facial and eye area of a driver's image, detects an area to which direct sunlight is incident in the facial area, and determines whether dazzling is affecting the drivers driving ability when the eye area is included in the area to which the direct sunlight is incident.

In some embodiments, the present invention provides a system and a method detects the direction of incident direct sunlight and then, blocks the direct sunlight in the direction to which light is incident.

In one aspect of the present invention, there is provided an apparatus for detecting driver's dazzling, including: an image photographer that photographs a driver's facial image; an eye area detector that detects an eye area of the driver's facial image photographed by the image photographer; a facial area detector that detects a facial area of the driver's facial image photographed by the image photographer; an incident area detector that detects an area (hereinafter, referred to as an incident area) to which direct sunlight is incident in the facial area detected by the facial area detector; and a dazzling detector that determines whether dazzling is effecting the drivers driving ability when the eye area is included in the area to which the direct sunlight is incident.

In another aspect of the present invention, there is provided a method for detecting driver's dazzling, including: photographing, by an image photographer, a driver's facial image; detecting, by an eye area detector, an eye area of the driver's facial image; detecting, by a facial area detector, the facial area of the driver's facial image; detecting, by an incident area detector, an area (hereinafter, referred to as an incident area) to which direct sunlight is incident in the facial area; and determining, by the dazzling detector, whether dazzling is effecting the drivers driving ability when the eye area is included in the area to which the direct sunlight is incident.

In another aspect of the present invention, there is provided an apparatus for blocking dazzling, including: a dazzling detector that detects a facial area and an eye area of a driver's facial image, detects an area (hereinafter, referred to as an incident area) to which direct sunlight is incident in the facial area, and determines whether dazzling is effecting the drivers driving ability when the eye area is included in the area to which the direct sunlight is incident; an incident area shape recognizer that recognizes a shape of the incident area detected by the dazzling detector; an incident direction detector that detects an incident direction based on a shape of the incident area recognized by the incident area shape recognizer and the facial area detected by the dazzling detector; and a blocking apparatus driver configured to adjust and operate blocking apparatus to block direct sunlight from the incident direction detected by the incident direction detector.

In another aspect of the present invention, there is provided a method for blocking dazzling, including: detecting, by a dazzling detector, a facial area and an eye area of a driver's facial image, detecting an area (hereinafter, referred to as an incident area) to which direct sunlight is incident in the facial area, and determining whether dazzling is effecting the drivers driving ability when the eye area is included in the area to which the direct sunlight is incident; recognizing, by an incident area shape recognizer, a shape of the incident area; detecting, by an incident direction detector, an incident direction based on a shape of the recognized incident area and the detected facial area; and blocking, by a blocking apparatus driver, direct sunlight from the detected incident direction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
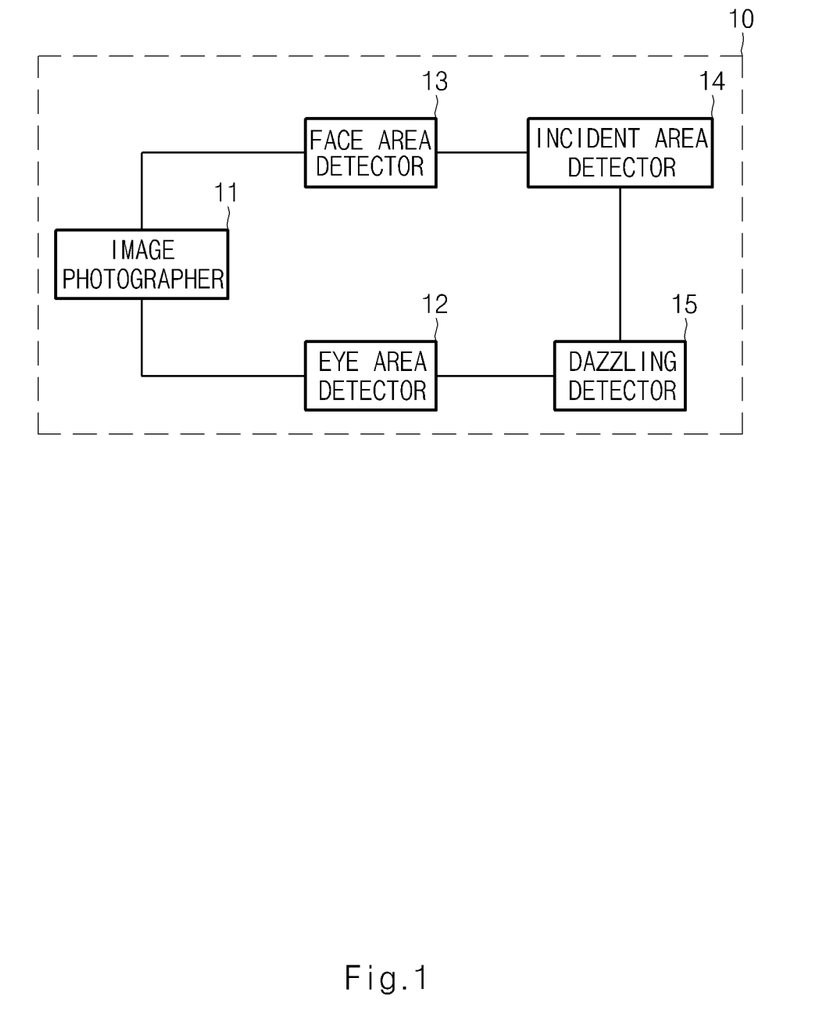
FIG. 1 is a configuration diagram of an apparatus for detecting driver's dazzling according to an exemplary embodiment of the present invention.

FIG. 1 is a configuration diagram of an apparatus for detecting driver's dazzling according to an exemplary embodiment of the present invention. As shown in FIG. 1, an apparatus 10 for detecting driver's dazzling according to an exemplary embodiment of the present invention, which is an apparatus mounted in a vehicle to detect whether dazzling is effecting a driver's ability to drive due to direct sunlight in their eyes, includes an image photographer 11, an eye area detector 12, a facial area detector 13, an incident area detector 14, and a dazzling detector 15.

Figure 2A:
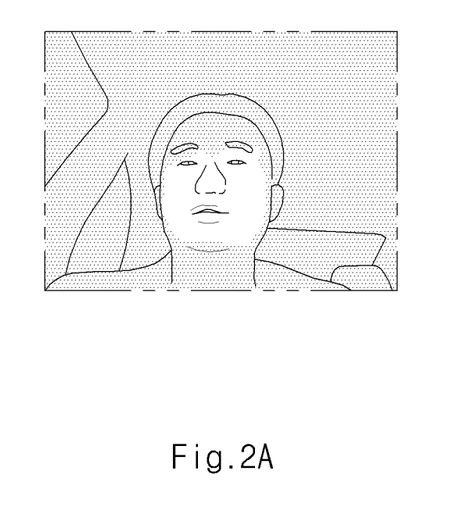
FIG. 2A to 2D are an exemplified diagram showing detection results of dazzling according to an exemplary embodiment of the present invention.

Describing each component, the image photographer 11, which is, for example, a charge coup led device (CCD) camera mounted in a vehicle, photographs a driver's facial image. The photographed facial image is, for example, shown in FIG. 2A.

Figure 2B:
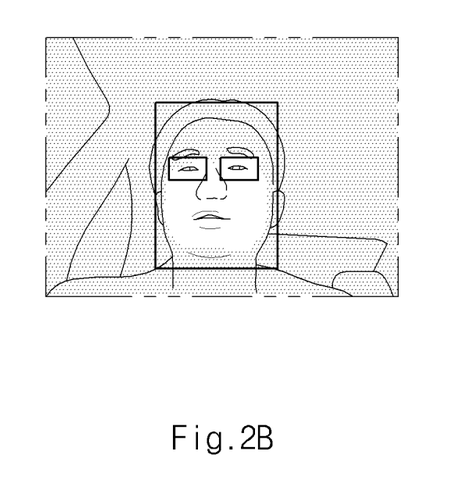

The eye area detector 12 detects the eye area of the driver's facial image that is photographed by the image photographer 11. The detected eye area is shown in FIG. 2B. The facial area detector 13 detects the facial area of the driver's facial image that is photographed by the image photographer 11. The detected facial area is shown in FIG. 2B.

Figure 2C:
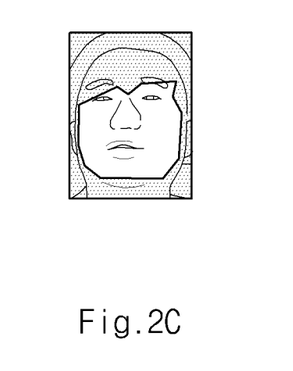

The incident area detector 14 detects an area (hereinafter, referred to as an incident area) to which the direct sunlight is incident in the facial area detected by the facial area detector 13. The detected incident area is shown in FIG. 2C.

Figure 2D:
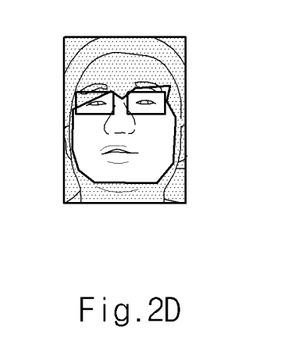

The dazzling detector 15 confirms whether the incident area detected by the incident area detector 14 overlaps the eye area detected by the eye area detector 12 to determine that the dazzling is occurring when the incident area overlaps the eye area and determines that the dazzling is co-occurring when the incident are does not overlap the eye area, as shown in FIG. 2D.

The exemplary embodiment of the present invention does not include the image photographer 11 and interoperates with a driver state monitoring (DSM) system, thereby capturing the driver's facial image. Further, the eye area detector 12 and the facial area detector 13 according to the exemplary embodiment of the present invention that are a known technology may be implemented by a single detection module.

Figure 3:
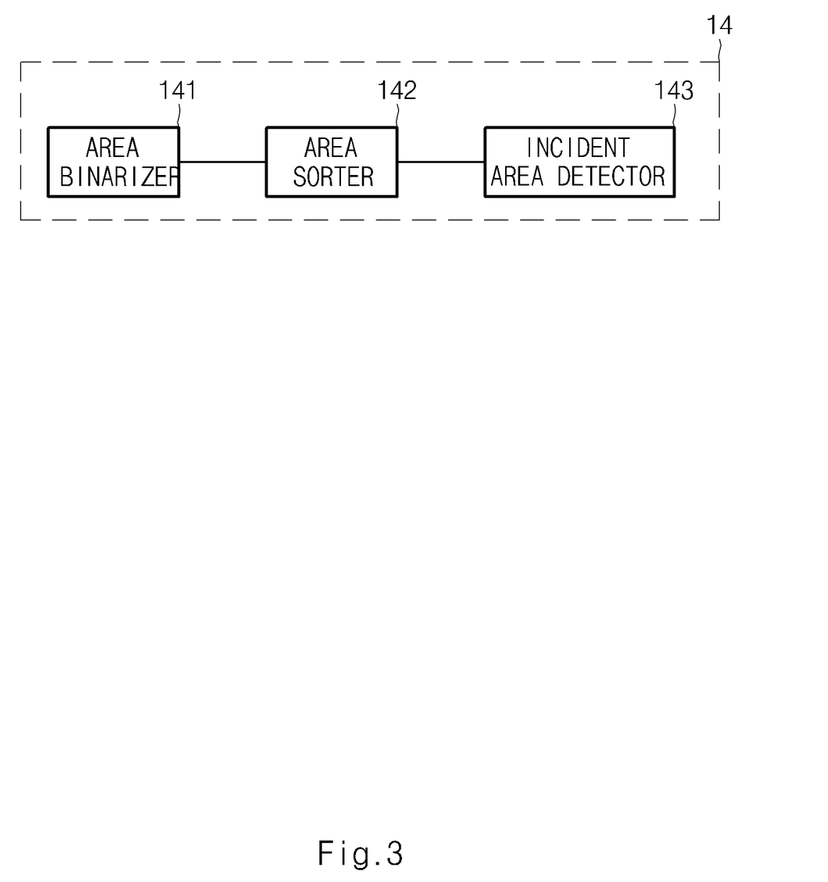
FIG. 3 is a detailed configuration diagram of an incident area detector according to an exemplary embodiment of the present invention.

Hereinafter, the incident area detector 14 will be described in more detail with reference to FIG. 3. As shown in FIG. 3, the incident area detector 14 according to the exemplary embodiment of the present invention includes an area binarizer 141, an area sorter 142, and an incident area detector 143.

First, the area binarizer 141 performs a binarization process of applying a predetermined threshold value to the facial area detected by the facial area detector 13 to represent the facial area as black or white. That is, the area binarizer 141 represents the facial area as white when brightness of each pixel within the facial area exceeds a given threshold value and represents the facial area as black when the brightness thereof does not exceed the given threshold value.

In this case, the threshold value is not a fixed value, but is a value corresponding to an exposure value of the image photographer 11. That is, the brightness distribution of the facial area within the image is varied based on the exposure value of the image photographer 11. Furthermore, in some embodiments it may be preferable to set the threshold value to correspond with the exposure value.

The area sorter 142 sorts the facial area binarized by the area binarizer 141 into a black area and a white area. In this case, the area sorter 142 may sort an area by an X-Y projection mechanism or a labeling mechanism. The incident area detector 143 detects the white area sorted by the area sorter 142 as the incident area.

Figure 4:
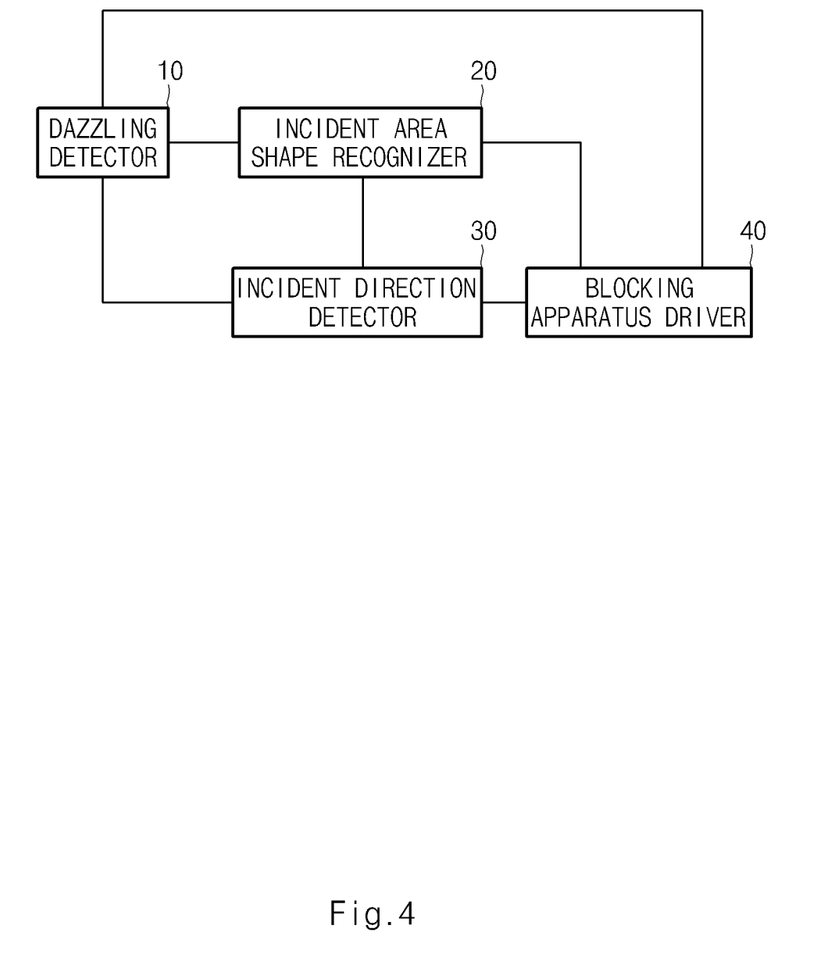
FIG. 4 is a configuration diagram of a system for blocking dazzling according to an exemplary embodiment of the present invention.

FIG. 4 is a configuration diagram of a system for blocking dazzling using driver's dazzling detection according to an exemplary embodiment of the present invention. As shown in FIG. 4, the system for blocking dazzling using the driver's dazzling detection according to the exemplary embodiment of the present invention includes the apparatus 10 for detecting dazzling, an incident area shape recognizer 20, an incident direction detector 30, and a blocking apparatus driver 40.

Each component of the apparatus 10 for detecting whether dazzling is affecting the driving ability of the driver is described by the aforementioned scheme.

The incident area shape recognizer 20 recognizes the shape of the incident area that is detected by the incident region detector 14. In this case, the incident area shape recognizer 20 may recognize the incident area shape by the X-Y projection mechanism, the labeling mechanism, a facial area brightness value distribution analysis mechanism, or the like.

The incident direction detector 30 approximates a boundary line between the shape recognized by the incident area shape recognizer 20 and the facial area detected by the facial area detector 13 to a straight line and then, detects the incident direction based on a slope of the straight line.

The blocking apparatus driver 40 adjusts and operates an apparatus for blocking direct sunlight such as a smart window, an electric sun-visor, or the like, so as to block the direct sunlight incident from a direction detected by the incident direction detector 30. In this case, the blocking apparatus driver 40 may also drive the apparatus for blocking direct sunlight only when the exposure value of the image photographer 11 does not exceed a reference value, thereby providing an automated sunlight blocking apparatus when the dazzling is affecting the driving ability of the driver.

In addition, the blocking apparatus driver 40 may not drive the apparatus for blocking direct sunlight when the incident area detected by the incident area detector 14 includes most (for example, 95% or more) of the facial area detected by the facial area detector 13. This feature effectively prevents errors due to a back-light phenomenon that introduces the direct sunlight into the image photographer 11.

In addition, the blocking apparatus driver 40 may be configured to not drive the apparatus for blocking direct sunlight when the dispersion of the brightness values of each pixel of the facial area does not exceed a reference value. This is to sort front light that indicates a state in which light is projected directly into the face of the subject and the back light which is not directed into the face of the subject.

Figure 5:
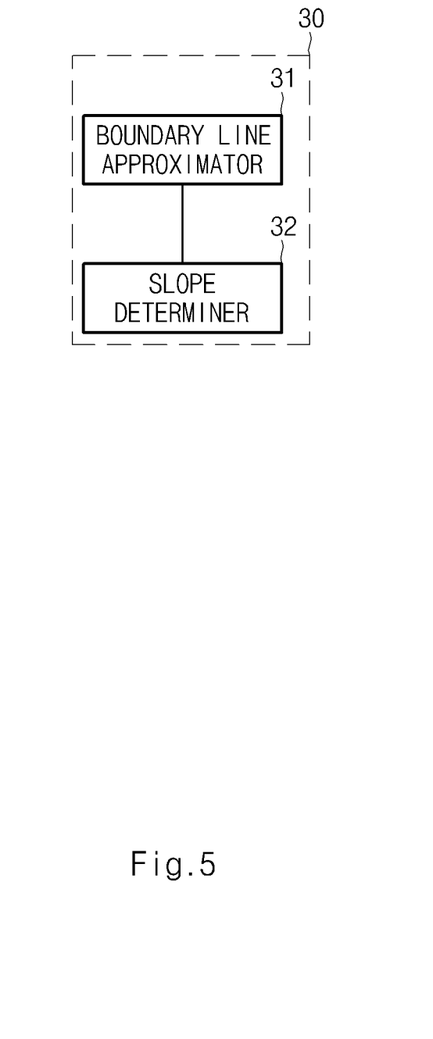
FIG. 5 is a detailed configuration diagram of an incident direction detector according to an exemplary embodiment of the present invention.

Hereinafter, the incident direction detector 30 will be described in more detail with reference to FIG. 5. As shown in FIG. 5, the incident direction detector 30 according to the exemplary embodiment of the present invention includes a boundary line approximator 31 and a slope determiner 32. First, the boundary line approximator 31 approximates the boundary line between the shape recognized by the incident area shape recognizer 20 and the facial area detected by the facial area detector 13 to a straight line.

Figure 6A:
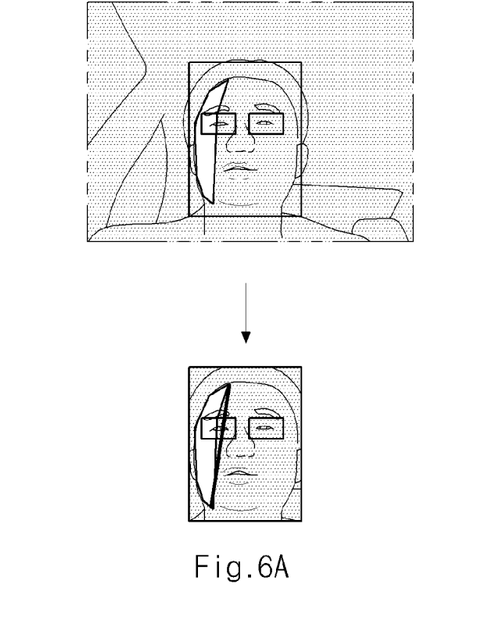
FIGS. 6A to 6C are exemplified diagrams of the incident direction detected by the system for blocking dazzling according to the exemplary embodiment of the present invention.
Figure 6B:
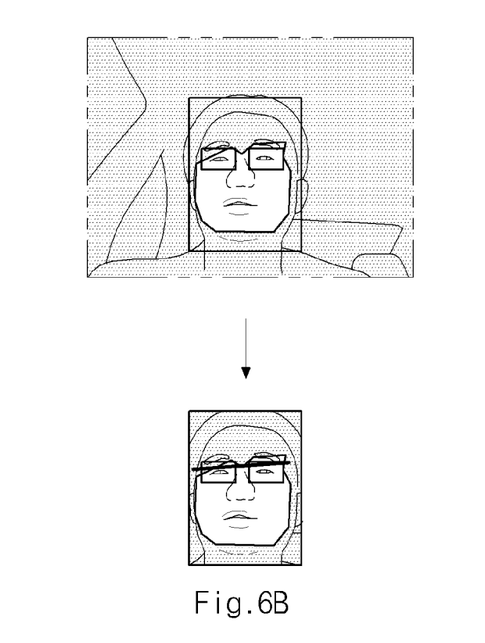
Figure 6C:
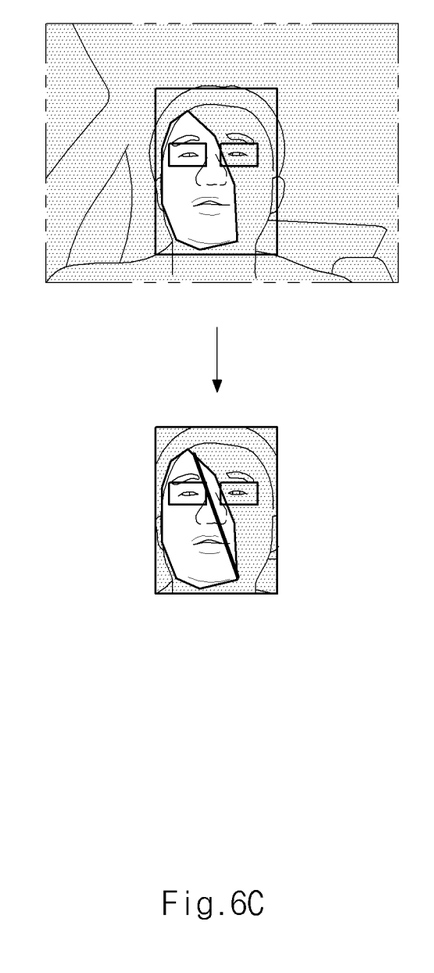

Various types of approximated boundary lines are shown in FIGS. 6A to 6C. The slope determiner 32 calculates a straight slope that is a result approximated by the boundary line approximator 31 to determine the incident direction of the direct sunlight.

FIG. 6A shows a state in which the direct sunlight is incident from sides, for example when the slope of the straight line satisfies a vertical range (e.g., 80° to 110°.

FIG. 6B shows a state in which the direct sunlight is incident from a front, for example, when the straight slope satisfies a horizontal range (e.g., 170° to 190°.

FIG. 6C shows a state in which the direct sunlight is incident from a front and sides, for example, when the straight slope does not correspond to the case of FIG. 6A or the case of FIG. 6B.

Figure 7:
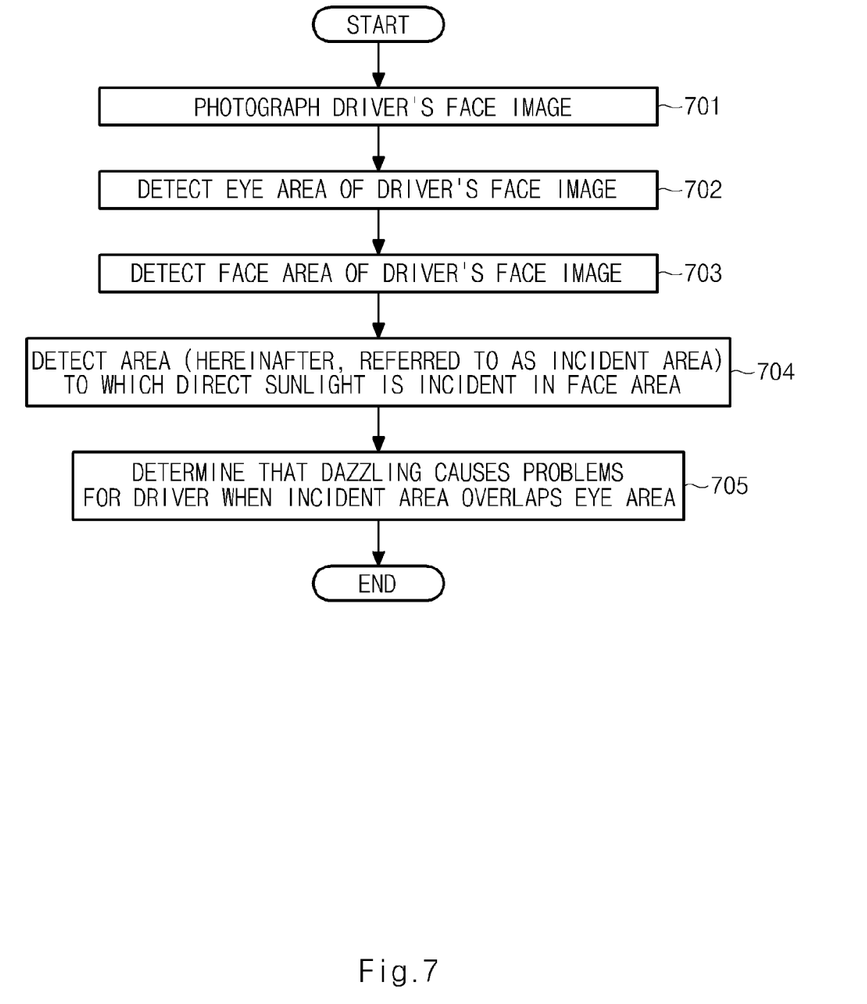
FIG. 7 is a flow chart of a method for detecting driver's dazzling according to an exemplary embodiment of the present invention.

FIG. 7 is a flow chart of a method for detecting driver's dazzling according to an exemplary embodiment of the present invention.

First, the image photographer 11 photographs the driver's facial image (701). Next, the eye area detector 12 detects the eye area of the driver's facial image (702). Then, the eye area detector 13 detects the facial area of the driver's facial image (703) and the incident area detector 14 detects the area to which the direct sunlight is incident in the facial area (hereinafter, referred to as the incident area) (704). In response, the dazzling detector 15 determines whether dazzling is affecting the drivers driving ability when the eye area is included in the area to which the direct sunlight is incident (705).

Figure 8:
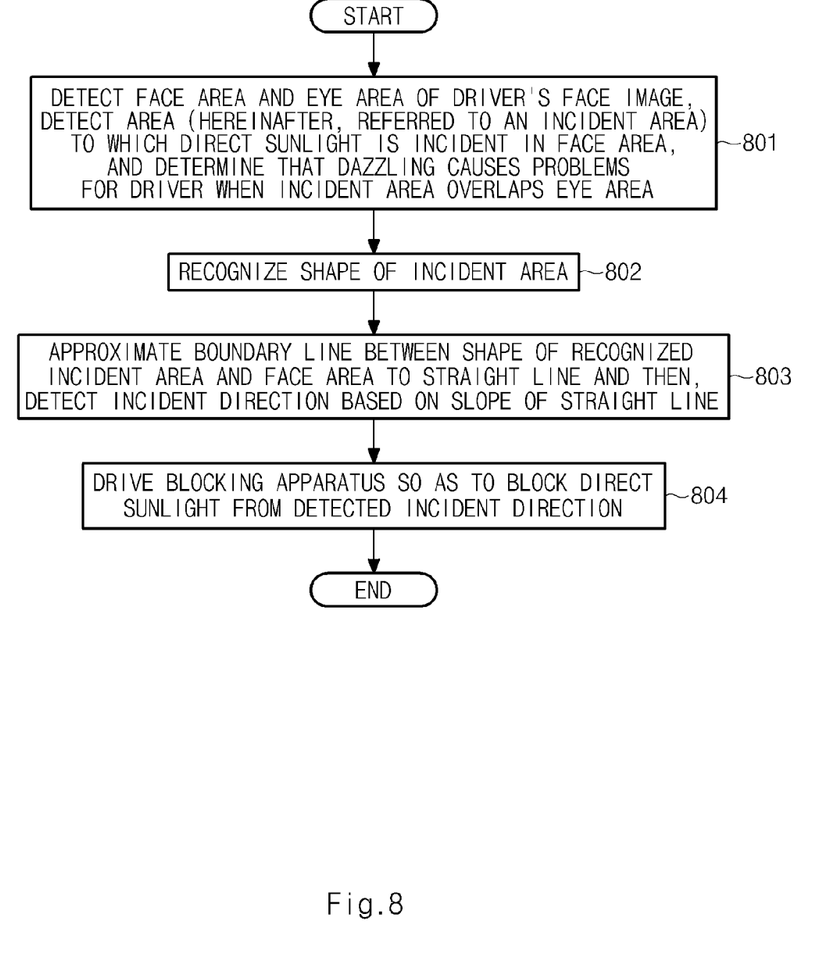
FIG. 8 is a flow chart of the method for detecting driver's dazzling according to the exemplary embodiment of the present invention.

FIG. 8 is a flow chart of the method for detecting driver's dazzling according to the exemplary embodiment of the present invention. First, the apparatus 10 for detecting dazzling detects the facial area and the eye area of the driver's facial image and detects the area to which the direct sunlight is incident in the facial area (hereinafter, referred to as the incident area) to determine whether dazzling is effecting the drivers driving ability when the eye area is included in the area to which the direct sunlight is incident (801). In response, the incident area shape recognizer 20 recognizes the shape of the incident area (802), and the incident direction detector 30 approximates the boundary line between the shape of the recognized incident area and the facial area to a straight line and then, detects the incident direction based on the slope of the straight line (803). Next, the blocking apparatus driver 40 adjusts and operates the blocking apparatus so as to block the direct sunlight from the detected incident direction (804).

In this case, the blocking apparatus driver 40 may also drive the apparatus for blocking direct sunlight only when the exposure value of the image photographer 11 does not exceed a given reference value, thereby providing an automated sunlight blocking apparatus when the dazzling is effecting the driving ability of the driver.

In addition, the blocking device driver 40 may not drive the apparatus for blocking direct sunlight when the incident area detected by the incident area detector 14 includes most (for example, 95% or more) of the facial area detected by the facial area detector 13. This feature effectively prevents errors due to a back-light phenomenon that introduces the direct sunlight into the image photographer 11.

The exemplary embodiments of the present invention advantageously automatically detects the facial area and the eye area of the driver's image, detects the area to which the direct sunlight is incident in the facial area, and determines whether dazzling is effecting the drivers driving ability when the eye area is included in the area to which the direct sunlight is incident to detect in the direction to which light is incident of the direct sunlight and then, blocks the direct sunlight in the direction to which light is incident, thereby enabling the driver to drive safely.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for blocking dazzling, comprising: detecting, by a dazzling detector, a facial area and an eye area of a driver's facial image;
    detecting, by the dazzling detector, an incident area to which direct sunlight is incident in the facial area;
    determining, by the dazzling detector, whether dazzling is affecting the driver's driving ability when the eye area is included in the area to which the direct sunlight is incident;
    recognizing, by an incident area shape recognizer, a shape of the incident area; detecting, by an incident direction detector, an incident direction based on a shape of the recognized incident area and the detected facial area, wherein the detecting of the incident direction includes:
    approximating, by a boundary line approximator, a boundary line between the shape of the recognized incident area and the detected facial area to a straight line;
    determining, by a slope determiner, the incident direction of the direct sunlight by calculating a slope of the straight line; and
    operating and adjusting, by a blocking apparatus driver, a blocking apparatus to block direct sunlight from the detected incident direction,
    wherein the determining of the incident direction includes:
    determining the incident direction as lateral incidence when the slope of the straight line satisfies a vertical range,
    determining the incident direction as front incidence when the slope of the straight line satisfies a horizontal range, and
    determining the incident direction as lateral and front incidence in cases other than the first and second determination.

2. The method according to claim 1, wherein the determining of the dazzling includes:

photographing, by an image photographer, a driver's facial image; detecting, by an eye area detector, an eye area of the driver's facial image; detecting, by a facial area detector, a facial area of the driver's facial image;

detecting, by an incident area detector, an incident area to which direct sunlight is incident in the facial area; and determining, by a dazzling detector, whether dazzling is affecting the drivers driving ability when the eye area is included in the area to which the direct sunlight is incident.

3. The method according to claim 2, wherein the detecting of the incident area includes:

applying, by an area binarizer, a threshold value to the detected facial area to represent the facial area as black or white;

sorting, by an area sorter, the binarized facial area into a black area and a white area; and detecting, by an incident area detector, the sorted white area as the incident area.

4. The method according to claim 3, wherein the binarizing includes:

representing the facial area as white when brightness of each pixel within the facial area exceeds the threshold value; and representing the facial area as black when the brightness thereof does not exceeds the threshold value.

5. The method according to claim 2, wherein the driving of the blocking apparatus drives the blocking apparatus when an exposure value of the image photographer does not exceed a first reference value.

6. The method according to claim 2, wherein the driving of the blocking apparatus does not drive the blocking apparatus when the incident area detected by the incident area detector includes the facial area detected by the facial area detector of a second reference value or more.

* * * * *